United States Patent Office 3,271,467
Patented Sept. 6, 1966

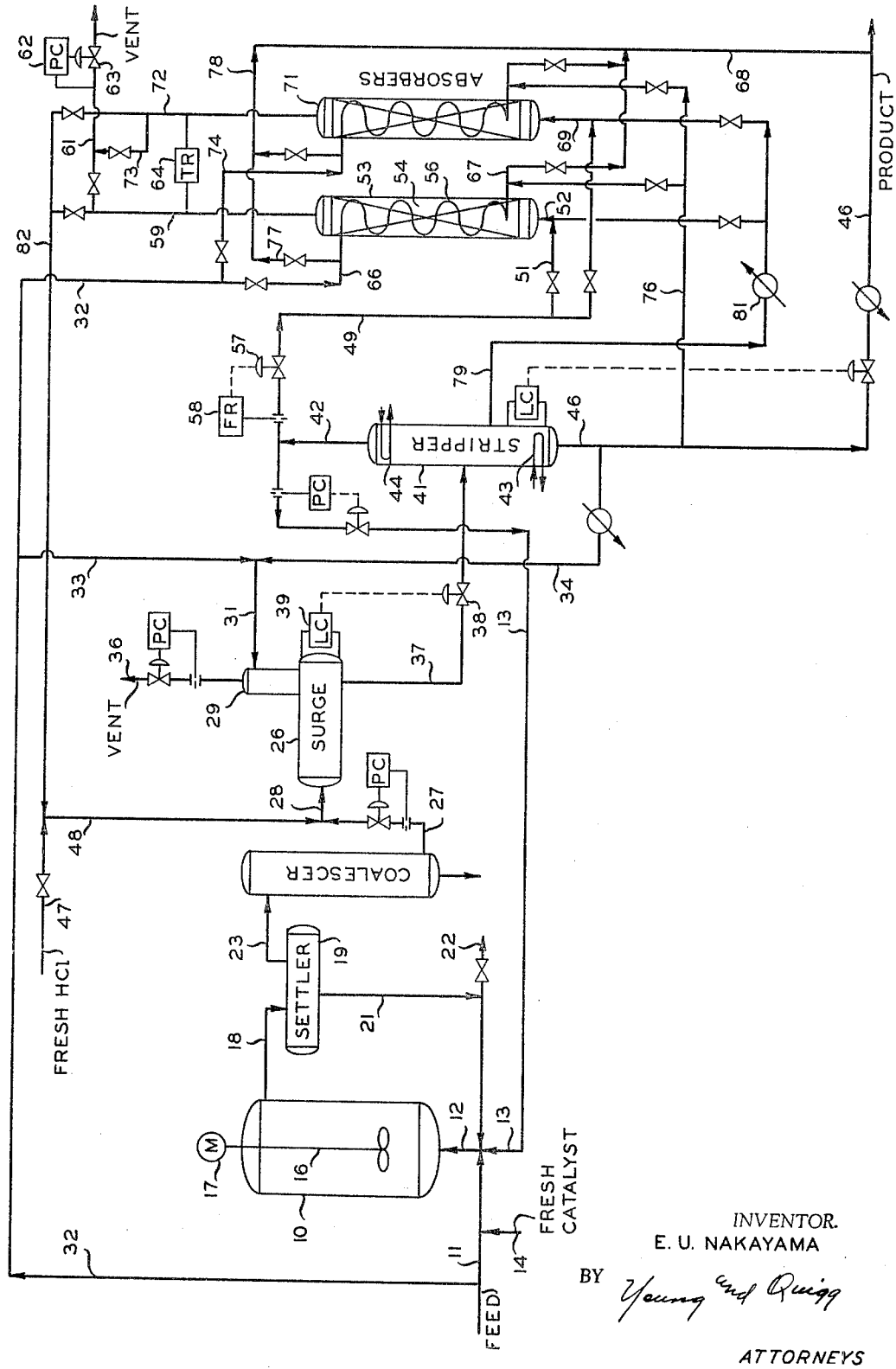

3,271,467
MAINTAINING HYDROGEN HALIDE CONCENTRATION IN THE CONVERSION OF HYDROCARBONS EMPLOYING METAL HALIDE CATALYSTS AND HYDROGEN HALIDE PROMOTER
Eddie U. Nakayama, Bartlesville, Okla., assignor to Phillips Petroleum Company, a corporation of Delaware
Filed Aug. 29, 1963, Ser. No. 305,407
8 Claims. (Cl. 260—666)

This invention relates to a process and an apparatus for maintaining hydrogen halide concentration in the conversion of hydrocarbons employing a metal halide catalyst and a hydrogen halide promoter. In one aspect this invention relates to a process for maintaining hydrogen halide concentration in a process for isomerizing hydrocarbons in the presence of a metal halide catalyst and a hydrogen halide promoter. In another aspect this invention relates to an apparatus for maintaining hydrogen halide concentration in a process for isomerizing hydrocarbons in the presence of a metal halide catalyst and a hydrogen halide promoter.

Various hydrogen fractions of petroleum contain large amounts of naphthenic compounds and normal paraffins. Many of these compounds are relatively useless in their original form; however, they can be converted to valuable materials which are useful in motor fuels or as starting materials in chemical processes. Thus, for example, n-hexane which has a low octane number can be converted to isohexanes which have high octane numbers and form valuable components of motor fuels. Also, compounds such as methylcyclopentane can be converted to cyclohexane which is a starting material in the manufacture of nylon fibers. In one well known method normal paraffins and naphthenes are isomerized in the presence of a metal halide catalyst and a hydrogen halide, for example, aluminum chloride and hydrogen chloride. The proportion of hydrogen halide present in the reaction system has a substantial effect of the isomerization reaction; therefore, it is desirable that the concentration of this material in the process system be controlled to provide a substantially constant concentration of hydrogen halide relative to the fresh hydrocarbon feed in the reaction zone.

In one well known isomerization reaction hydrocarbon reactants are contacted in a reactor with a metal halide catalyst in the presence of a hydrogen halide and under suitable conditions to effect the isomerization reaction. Effluent from the reactor is passed to a settler wherein separation of the major proportion of catalyst is effected, the catalyst normally being recycled to the reactor. The hydrocarbon portion of the reaction effluent is then further processed to remove residual catalyst after which it is introduced to a surge vessel which serves as a feed tank for a hydrogen halide stripper wherein hydrogen halide and lighter materials are separated from the effluent. The bottoms product from the hydrogen stripper comprises the desired isomerizate which can be processed further, for example, by separation into various desired fractions. The overhead from the hydrogen halide stripper comprises lighter hydrocarbons, non-condensible gases, etc., and hydrogen halide. This steam is normally recycled to the reactor to provide reuse of the hydrogen halide contained therein. Further details of such an isomerization process can be found in Patent 2,953,606, issued September 20, 1962, L. E. Dean et al.

In liquid phase catalytic isomerization processes, such as those described above, for the isomerization of hydrocarbons, e.g., hexanes, various inert non-condensible gases such as hydrogen, methane, ethane, and propane are formed in small amounts in the reaction. Furthermore, trace amounts of said non-condensibles are usually present in the feedstock, the amount thereof depending upon the efficiency of the various feed processing steps used in the feedstock preparation. Inasmuch as said non-condensibles tend to accumulate in the system, provision is ordinarily made to periodically vent these materials from an appropriate point in the system, for example, from the surge tank containing the feed to the hydrogen halide stripper. To replace hydrogen halide which is lost from the system in the vent gases and from other causes, for example, leaks from process equipment, it has been the practice to periodically add fresh hydrogen halide to the system. Even this fresh hydrogen halide is a source of non-condensible gases such as hydrogen, carbon monoxide and carbon dioxide because commercial hydrogen chloride, for example, is usually only about 95 percent hydrogen chloride.

As used herein and in the claims, unless otherwise specified, the term "non-condensibles" refers to materials which are non-condensible under the temperature and pressure conditions normally existing in the process system. Examples of such materials, in addition to hydrogen halides such as hydrogen chloride, include hydrogen, nitrogen, carbon monoxide, carbon dioxide, methane, ethane, and propane.

It is essential that the build-up of such non-condensible gases in the process system be controlled. Otherwise, the system will pressure-up or, if the system pressure is set at a constant value, said non-condensible gases must be removed so that they will not replace or dilute the hydrogen halide which is recycled from the hydrogen halide stripper to the reactor. Replacement or dilution of hydrogen halide in the hydrogen halide recycle stream results in less hydrogen halide being available in the reactor for promoting catalyst activity. As a result, conversion of the hydrocarbons decreases and the reactor, settler, stripper feed surge tank and the hydrogen halide stripper become loaded with recycle material that serves no useful purpose. Indeed, unless steps are taken to remove or keep the amount of non-condensibles in the system under control, the concentration of same will build up to the point where it becomes uncontrollable.

The most commonly employed metal halide catalyst is aluminum chloride with its corresponding hydrogen chloride promoter. For this reason the subsequent description of the invention will be with particular reference to aluminum chloride catalyst and hydrogen chloride promoter. However, it is to be clearly understood the invention is applicable to other metal halide catalysts and other hydrogen halide promoters. Since ethane boils at about the same conditions as hydrogen chloride, venting of non-condensible gases from the system to maintain a satisfactory hydrogen chloride concentration in the system and satisfactory conversion levels in the reaction zone can only be made to operate satisfactorily when venting excessively large quantities of hydrogen chloride along with the other non-condensible gases. This increases the amount of make-up hydrogen chloride and seriously affects the economics of the process. The presence of propane, which has an appreciably higher boiling point than hydrogen chloride, aggravates the situation even more.

To overcome the above-described difficulties the present invention provides a combination process for removing non-condensible gases from the process system and maintaining the concentration of hydrogen halide, e.g., hydrogen chloride in said process system. According to the invention, non-condensible gases lighter than hydrogen chloride, i.e., lower boiling, are removed from the process system at a point upstream from the hydrogen chloride stripper and non-condensible gases which boil at about the same conditions as hydrogen chloride or are higher boiling are removed from the hydrogen chloride recycle stream.

Thus, broadly speaking, the present invention resides in the improvement: in a process for the conversion of hydrocarbons in the presence of a metal halide catalyst and a hydrogen halide promoter where in a reaction zone hydrocarbon effluent is passed to a hydrogen halide stripper for removal of a gaseous stream rich in hydrogen halide which is recycled to said reaction zone, and wherein build-up of non-condensible gases in the process system occurs; said improvement comprising removing a stream comprising non-condensibles lower boiling than said hydrogen halide from the process system at a point upstream of said hydrogen halide stripper and contacting a small portion of said hydrogen halide recycle stream with a solid adsorbent to adsorbent hydrogen halide therefrom and thus separate same from the non-condensibles which boil at about the same conditions or are higher boiling than hydrogen halide. Said last-mentioned non-condensibles are vented from the process system. Said adsorbed hydrogen halide is subsequently desorbed and returned to the process system to maintain the concentration of hydrogen halide therein.

An object of this invention is to provide an improved process and apparatus for the conversion of hydrocarbons in the presence of a metal halide catalyst and a hydrogen halide promoter. Another object of this invention is to provide an improved process and apparatus for the isomerization of hydrocarbons in the presence of a metal halide catalyst and a hydrogen halide promoter. Another object of this invention is to provide a method and apparatus for maintaining the concentration of hydrogen halide in a process for the conversion of hydrocarbons in the presence of a metal halide catalyst and a hydrogen halide promoter. Another object of this invention is to provide a method for reducing the amount of make-up hydrogen halide required in a process for the conversion, e.g., isomerization of hydrocarbons in the presence of a metal halide catalyst and a hydrogen halide promoter. Other aspects, objects and advantages of the invention will be apparent to those skilled in the art in view of this disclosure.

Thus, according to the invention there is provided an improvement in a process for the conversion of a hydrocarbon in the presence of a metal halide catalyst and a hydrogen halide promoter in a reaction zone, wherein hydrocarbon effluent from said reaction zone is introduced into a stripping zone from which a gaseous stream rich in hydrogen halide is separated, non-condensible gases including hydrogen halide, gases lower boiling than hydrogen halide and other non-condensible gases boiling about the same as and higher than hydrogen halide are vented from the process system upstream from said stripping zone, and wherein said gaseous stream rich in hydrogen halide is recycled from said stripping zone to said reaction zone, said improvement comprising: venting non-condensible gases lower boiling than hydrogen halide from the process system upstream from said stripping zone; contacting a portion of said gaseous recycle in an adsorption zone with a solid adsorbent to selectively adsorb hydrogen halide therefrom; venting said other non-condensible gases from said adsorption zone as non-adsorbed gases; and subsequently desorbing said adsorbed hydrogen halide and returning same to said process system.

Further according to the invention, there is provided a combination of apparatus for carrying out the above-described method of the invention.

It is to be noted that the invention provides a combination process for maintaining the concentration of hydrogen halide, with minimum hydrogen halide make-up, in a process for the conversion of hydrocarbons in the presence of a metal halide catalyst and hydrogen halide promoter. In said combination the non-condensible gases lighter than the hydrogen halide being employed, i.e., lower boiling than said hydrogen halide, are vented from the system at a point upstream of the hydrogen halide stripper wherein the gaseous hydrogen halide recycle stream is separated. Non-condensible gases of approximately the same boiling point or higher boiling point as said hydrogen halide, are removed from a portion of said hydrogen recycle stream. As shown more fully hereinafter, removing all of said non-condensible gases at either one of said points of removal is unsatisfactory.

The process of this invention is applicable in general to the conversion of hydrocarbons and is particularly applicable to the conversion of hydrocarbons by isomerization. A wide variety of hydrocarbons can be converted in the isomerization reaction, for example, straight chain paraffins such as butane, pentane, hexane, heptane and higher molecular weight compounds can be converted to various isomers. Also, moderately branched paraffins can be converted to more highly branched materials; thus, 2-methylpentane can be isomerized to 2,2-dimethylbutane. It is also possible to isomerize naphthenic hydrocarbons having 5, 6, 7 and more carbon atoms in the rings. Examples include the isomerization of methylcyclopentane to cyclohexane, 1,1-dimethylcyclobutane to methylcyclopentane, 2-dimethylcyclopentane to methylcyclohexane, and the like. The isomerization reaction is usually carried out at a temperature between about 75° F. and about 750° F. at pressures from 1 atomsphere to 1000 p.s.i. or higher and at liquid hourly space velocities from about 0.1 to about 20.

The catalysts employed in carrying out isomerization comprise metal halides such as aluminum chloride, aluminum bromide, boron trifluoride, and the halides of metals such as zinc, tin, arsenic, antimony, zirconium, beryllium, titanium, iron and the like. The catalysts are especially effective when present as complexes which are formed by interaction between the metal halides and hydrocarbons present in the reaction system. A particularly desirable reaction catalyst is the complex of hydrocarbons with aluminum chloride.

The following discussion will be directed primarily to the isomerization of a feed mixture comprising normal hexane and methylcyclopentane in the presence of aluminum chloride. This is not intended, however, in any limiting sense and it is within the scope of the invention to isomerize hydrocarbons in general using catalysts selected from those hereinbefore set forth. The isomerization of normal acylic and alkyl-substituted alicyclic hydrocarbons such as normal hexane and methylcyclopentane is carried out usually at a temperature in the range of about 90° F. to about 160° F. The reaction is preferably effected under sufficient pressure to provide a liquid phase reaction, namely, a pressure in the range of between about 150 and about 300 p.s.i.g. The contact or residence time of the reactants in the reaction zone varies but is usually between about 0.1 and about 5 hours. In addition to the catalyst, it is desirable that the corresponding hydrogen halide be present in the reaction zone since this material maintains catalyst activity at a high level. The amount of hydrogen chloride present is usually between about 2 and about 6 perecnt by weight based on the hydrocarbon reactant with about 4 percent by weight being preferred. The hydrocarbon-to-catalyst ratio is also an important factor in the isomerization reaction and this ratio is generally maintained between about 0.2:1 and about 1.4:1, although ratios as high as 5:1 can be used if reaction temperatures are increased.

The attached drawing is a diagrammatic illustration of a process for isomerizing normal acylic and alkyl-substituted alicyclic hydrocarbons as described above, and which also incorporates the present invention. It will be understood that many pumps, valves, control equipment, etc., not necessary for explaining the invention to those skilled in the art, have been omitted for brevity.

Referring to the drawing, a feed material comprising a mixture of normal hexane, methylcyclopentane and containing some cyclohexane and isohexanes is introduced into reactor 10 through conduits 11 and 12. Prior to entering the reactor the feed is combined with recycle gases containing hydrogen chloride from conduit 13. Simultaneous with the entrance of feed and hydrogen chloride to the reactor, fresh aluminum chloride catalyst can be introduced thereto through conduit 14. Said fresh catalyst can be either aluminum chloride hydrocarbon complex prepared as known in the art or provision can be made to pass all or a portion of the hydrocarbon feed through an aluminum chloride saturator (not shown) as described in said Dean et al. patent. The principal reaction which takes place in reactor 10 is the isomerization of normal hexane to 2-methylpentane and methylcyclopentane to cyclohexane. In addition, three other isomers of normal hexane, namely, neohexane, diisopropyl and 3-methylpentane are also formed in varying quantities. During the course of the reaction, the contents of the reactor are maintained in an agitated state by stirrer 16 which is driven by a motor 17.
of normal hexane to 2-methylpentane and methylcyclo- Effluent from the reactor comprising unreacted normal hexane, unreacted methylcyclopentane, cyclohexane and the various isohexanes is passed through conduit 18 and enters settler 19 wherein entrained catalyst is separated from the hydrocarbon material, the major portion of the settled catalyst being returned to the reactor through conduits 21 and 12. Inasmuch as the catalyst gradually loses its activity, it is desirable that a portion of it be either periodically or continuously withdrawn from the system. For this purpose, a conduit 22 is provided through which spent catalyst can be withdrawn. Although a substantial separation of catalyst and hydrocarbon is effected in settler 19, the hydrocarbon effluent therefrom still contains finely divided aluminum chloride and a major proportion of the hydrogen chloride. This stream is passed through conduit 23 into coalescer 24 for the purpose of effecting removal and recovery of these materials which are undesirable in the product. Various inert materials can be used for coalescing the catalyst including sand, charcoal, and the like; however, bauxite is preferred for this purpose. The effluent from the coalescers being substantially free of aluminum chloride catalyst is introduced to hydrogen chloride stripper feed surge tank 26 through conduits 27 and 28. The isomerization reaction effluent usually contains small quantities of light gaseous hydrocarbons. As hereinafter described, these materials are normally removed from said effluent in the hydrogen chloride stripper along with hydrogen chloride. However, since the hydrogen chloride is recycled to the isomerization reactor, said light hydrocarbons along with other non-condensibles will eventually build up in the system. As discussed further hereinafter, in the practice of the invention venting of gases is provided through vent gas absorber 29, which is disposed on the stripper feed surge tank, in order to reduce the amount of such a build-up. In order to minimize loss of hydrogen chloride in this operation, the vent gas absorber is refluxed through conduit 31 with any suitable hydrocarbon such as a stream of the fresh hydrocarbon feed from conduits 32 and 33 or with bottoms from the hydrogen chloride stripper via conduit 34. A portion of the hydrogen chloride in the vent gases is thus absorbed and returned to the stripper feed surge tank. The non-absorbed gases are passed from the process system through conduit 36.

Accumulated material in the feed surge tank is removed therefrom through conduit 37 and motor valve 38, which is controlled by liquid-level controller 39 and introduced to hydrogen chloride stripper 41 wherein the major proportion of the hydrogen chloride is separated from the reactor hydrocarbon effluent. The overhead product from said stripper 41, which comprises hydrogen chloride, hydrocarbon gases, and some other non-condensible gases, is removed via conduit 42 and a major portion thereof is returned to isomerization reactor 10 through conduit 13. The heat required in the stripping operation is provided by reboiler coil 43 which is disposed in the bottom portion of stripper 41. Reflux is supplied by cooling coil 44 which is disposed in the upper portion of stripper 41. The stripper bottoms product comprising principally the heavier hydrocarbon portion of the reactor hydrocarbon effluent is removed therefrom through conduits 46 and, except for a small portion which is utilized as described hereinafter, yielded from the unit. As desired, said bottoms product yield can be subjected to further various processing steps such as caustic washing and fractionation to separate the various components thereof. While every effort is made to prevent the loss of hydrogen chloride from the system, a small portion of this material escapes with the vent gas through conduit 36 and sometimes through various leaks in the process system. To replenish the supply of hydrogen chloride in the system, fresh hydrogen chloride is introduced to the hydrogen chloride stripper feed surge tank 26 through conduits 47 and 48.

A small portion of the overhead stream removed from hydrogen chloride stripper 41 via conduit 42 is passed via conduits 49, 51 and 52 into the lower portion of adsorption tower 53. Said adsorption tower can comprise any suitable type of vessel but is conveniently an elongated vessel as illustrated. Said vessels can conveniently be about two feet in diameter and about 30 feet in length. A bed of solid adsorbent material 54 is disposed within said adsorption tower 53. Said solid adsorbent material can comprise any suitable solid granular material having selectivity in adsorbing hydrogen halides, such as hydrogen chloride, preferentially to light hydrocarbons such as methane or ethane. Examples of suitable granular solid adsorbent materials include charcoal of either animal or vegetable origin, activated alumina, silica gel, diatomaceous earth, or any other active and porous earth or clay which will preferentially adsorb hydrogen halides such as hydrogen chloride. A presently preferred adsorbent is an activated alumina such as Alcon H-151 alumina in the form of ⅛-inch spheres. An indirect heat exchange coil 56 is disposed within said bed of adsorbent material. Said heat exchange coil can be any suitable type of an indirect heat exchanger but is preferably of the finned tube or pipe type so as to provide a maximum surface for heat exchange.

The flow of said overhead product from hydrogen chloride stripper 41 into said adsorption tower is controlled by motor valve 57 and flow recorder 58. The feed to said adsorption tower flows up through the bed of adsorbent material which adsorbs the hydrogen chloride contained therein and non-adsorbed gases are removed from the upper portion of said tower via conduit 59 and are vented from the process system via conduit 61. Flow through said conduit 61 is controlled by means of pressure controller 62 which actuates motor valve 63 to maintain the desired back pressure on the system. Said pressure controller 62 is usually set to maintain the highest possible back pressure consistent with the desired flow through the adsorbent bed. Usually said back pressure will be within the range of from about 160 to 180 p.s.i.g., or such as to permit about a 20 pound pressure drop through the bed of adsorbent material in the adsorption tower 53. Temperature of the gases leaving the adsorption bed is measured by a sensor positioned in conduit 59 and is recorded by temperature recorder 64. If desired, the amount of vapors being vented through conduit 61 can be measured by a flow indicator not shown. During the time that feed is being introduced or passed through said bed of adsorbent material a small stream, usually from about 1.5 to 3 gallons per minute, of cooled reactor feed is passed via conduits 32 and 66 into the top of heat exchange element 56. Said cooled reactor feed passes through said heat exchanger coil and removes the heat of adsorption. The amount of said cooled reactor feed is usually controlled to maintain the temperature of the adsorbent bed within the range of about 90 to about 110° F. Said cooling medium is withdrawn from the bottom of heat exchange coil 56 via conduit 67 and is passed into conduit 68 from which it joins the product stream in conduit 46.

When the solid adsorbent in adsorption tower 53 has become spent the feed stream of overhead vapors from hydrogen chloride stripper 41 is switched from conduits 51 and 52 into conduit 69 by means of the valve and manifold arrangement shown and is introduced into the bottom of adsorption tower 71 which is identical to said adsorption tower 53. The operation of said adsorption tower 71 is like that of adsorption tower 53 and non-adsorbed vapors are withdrawn from the upper portion thereof via conduits 72 and 73, and vented from the process system via conduit 61 as described above.

An added feature of the invention resides in the method provided for regenerating the solid adsorbent such as bed 54. After said adsorption tower 71 has been placed in service and the stream of cooling medium from conduit 32 has been switched from conduit 66 into conduit 74 by means of the valve and manifold arrangement shown, a portion of the hydrogen chloride stripper kettle product is passed from conduit 46 via conduits 76 and 67 into the bottom of heat exchange element 56 in adsorption tower 53. Said hot kettle product is circulated through said heat exchange element 56 and is withdrawn from said heat exchange element via conduit 77 and passed via conduits 78 and 68 into the hydrogen chloride stripper kettle product line 46. Preheating of the adsorbent bed in this manner is highly advantageous in that it makes possible the regeneration or stripping of the adsorbent bed with a stripping medium which is withdrawn from the process system. Said preheating increases the temperature of the bed to above the condensing temperature of the hydrogen chloride stripper kettle vapors and makes possible the use of said vapors as stripping medium. This is advantageous because said stripping vapors can be returned to the system with the adsorbed HCl without separation therefrom and without any contamination of the process system as might occur if a foreign stripping medium were utilized. After the temperature of adsorbent bed 54 has been increased to within the range of 250 to 500° F., preferably about 300° F., a stream of hydrogen chloride stripper kettle vapors is withdrawn via conduit 79, passed through heater 81, and introduced into said conduit 52 for introduction directly into the bottom of adsorbent bed 54. In said heater 81, which can be any suitable type of heater, said stripping vapors are heated to a temperature within the range of about 400 to 600° F., usually about 500° F. Said stripping vapors are passed into adsorbent bed 54 at a rate within the range of from 500 to 2500 cubic feet per hour, usually about 1000 cubic feet per hour, for a period of time sufficient to increase the temperature of the adsorbent bed to about 400° F. When the temperature of the adsorbent bed reaches about 350° F., circulation of kettle product through said heat exchange element 56 is discontinued and further heating of said bed is effected by the hot stripping vapors only.

Said hot stripping vapors strip the hydrogen chloride by reducing the vapor pressure thereof and increasing the temperature of the hydrogen chloride held in the pores of the alumina. Said stripping vapors along with the stripped hydrogen chloride are removed from the top of adsorption tower 53 via conduit 59 and are passed via conduits 82, 48 and 28 into hydrogen chloride feed surge tank 26. After the stripping of said adsorption bed 54 is completed, said bed is cooled to the desired operating adsorption temperature by circulating a stream of cooled reactor feed via conduits 32 and 66 into and through heat exchange elements 56 as previously described.

As will be evident to those skilled in the art in view of the above description, the various operating variables in the process of the invention are interrelated and a change in one of said variables will usually make a change in one or more of the other variables desirable. In the practice of the invention wherein vent gas absorber 29 is operated in combination with hydrogen chloride absorbers 53 and 71, said vent gas absorber serves primarily to keep the system vented of non-condensible gases which are lighter, i.e., lower boiling, than hydrogen chloride and said adsorbers 53 and 71 serve to remove the non-condensible gases which boil at about the same conditions or which are higher boiling than hydrogen chloride, e.g., ethane and propane. Some hydrogen chloride is unavoidably vented through vent gas absorber 29 and vent conduit 36 but the amount thereof is held to an absolute minimum in the practice of the invention by the controlled combination operation of said vent gas absorber 29 and said hydrogen chloride adsorbers 53 and 71.

In a system for the isomerization of normal hexane and methylcyclopentane at a reactor temperature of about 140° F., a reactor presure of about 150 p.s.i.g., in the presence of an aluminum chloride hydrocarbon complex catalyst, and operating with approximately 4 weight percent hydrogen chloride in the settler hydrocarbon effluent, said vent gas absorber 29 is usually operated at a pressure within the range of about 130 to about 150 p.s.i.g., usually about 140 p.s.i.g., and a reflux or absorbent rate within the range of 9,000 to 15,000 gallons per day, usually about 13,000 gallons per day. At these conditions, along with operation of the hydrogen chloride adsorbers 53 and 71 as described further hereinafter, the concentration of hydrogen chloride in the recycle stream in conduit 13 will usually line out at between about 84 and 90 volume percent depending upon the amount of ethane and other light hydrocarbons entering and being generated in the system. At different reactor temperatures and weight percent hydrogen chloride values in the settler 19 hydrocarbon effluent, the pressure at which vent gas absorber 29 is operated will require adjustment up or down to minimize hydrogen chloride loss therefrom. For an increase in reactor temperatures said vent gas absorber pressure is increased to prevent increased loss of hydrogen chloride from the system. An increase in the weight percent hydrogen chloride in the settler 19 hydrocarbon effluent will also require an increase in the pressure of the vent gas absorber 29. In the event of an increase in the amount of higher boiling light hydrocarbon, such as ethane, entering the system, it will be necessary to lower the pressure on vent gas absorber 29 with resulting increased loss of hydrogen chloride, or else increase the flow of hydrogen chloride stripper overhead vapors to adsorbers 53 and 71 so as to maintain the hydrogen chloride concentration in recycle conduit 13 at the desired level.

The flow rate of overhead vapors from hydrogen chloride stripper 41 to adsorbers 53 and 71 will depend upon the size of the adsorbent bed, the hydrogen chloride concentration in said vapors, and the desired hydrogen chloride concentration in recycle conduit 13. Said adsorption towers 53 and 71 can be designed for any convenient on-off operating cycle, e.g., 8 hours on adsorption and 8 hours on regeneration. The higher the hydrogen chloride concentration in the vapors being passed to said adsorption towers is, the less of said vapors will be passed to said adsorption towers. In any event, however, the feed rate of said vapors will always be a small portion of the overhead stream from hydrogen chloride stripper 41, usually from 0.5 to about 3 volume percent, more usually from 0.5 to 1.5 volume percent. However, it is within the scope of the invention to employ feed rates which are outside said ranges. In a system designed for an 8-hour on-off operation cycle on adsorbers 53 and 71, for example, the feed flow rate to said adsorbers will be within the range of from about 375 cubic feet per hour for a feed stream containing about 95 percent hydrogen chloride to about 425 cubic feet per hour for a feed stream containing about 85 percent hydrogen chloride, in a system wherein the total vapor stream overhead from hydrogen chloride stripper 41 is in the order of 42,000 to 45,000 cubic feet per hour.

The various operating conditions during the adsorption and regeneration cycles for the adsorption beds in adsorption towers 53 and 71 are also interrelated but are usually within the ranges given above.

The following example will serve to further illustrate the invention.

*Example*

A hydrocarbon feed stream mixture comprising normal hexane and methylcyclopentane in an amount of 527,000 gallons per day is passed through conduits 11 and 12 into reactor 10 and therein contacted with an aluminum chloride hydrocarbon complex catalyst (containing approximately 60 weight percent $AlCl_3$) at a hydrocarbon to catalyst ratio of about 0.9:1, a temperature of about 140° F., a pressure of about 150 p.s.i.g., and in the presence of hydrogen chloride present in the amount of about 4 weight percent based on the hydrocarbon reactant. Pertinent flow rates and stream compositions for the hydrogen chloride circulation and purification portion of the process system are set forth in the table below for conditions when operating without the present invention and when operating in accordance with the present invention.

TABLE

| | Operation Without Present Invention | Operation in Accordance With Present Invention |
|---|---|---|
| HCl make-up (47): | | |
|   Mols per day (lb. mols) | 14 | 2.5 |
| HCl Stripper Feed Tk. (26): | | |
|   Temperature, ° F | 140 | 140 |
|   Pressure, p.s.i.g | 140 | 140 |
| Vent Gas (36): | | |
|   Quantity, s.c.f.d | 8,500 | 2,800 |
|   HCl, vol. percent | 55 | 13.5 |
| HCl Stripper Tower (41): | | |
|   Top temp., ° F | 100 | 100 |
|   Bottom temp., ° F | 365 | 365 |
|   Pressure, p.s.i.g | 190 | 190 |
| Overhead stream (42): | | |
|   HCl, vol. percent | 79 | 85 |
|   Total volume, s.c.f.h | 45,225 | 42,545 |
| Feed to adsorber 53 or 71: | | |
|   Volume, s.c.f.h | 0 | 425 |
|   Vol. percent of O.H. stream 42 | 0 | |
| HCl Recycle Stream to Reactor (13): | | |
|   Volume, s.c.f.h | 45,225 | 42,120 |
|   Composition, vol. percent: | | |
|     $H_2$, $CO_2$, $N_2$ and $C_1$ | 2.7 | 4.6 |
|     $C_2$, $C_3$ and $C_4$ | 18.3 | 10.4 |
|     HCl | 79.0 | 85.0 |

The data set forth in the above table clearly illustrate the real and effective co-operation between the vent gas absorber 29 and the adsorbers 53 and 71 when operated in combination in accordance with the invention. For example, in the operation without the present invention the make-up hydrogen chloride requirement (conduit 47) is 14 pound mols per day, whereas when operating in accordance with the invention the make-up hydrogen chloride requirement is only 2.5 mols per day. It should also be noted that, even with the higher make-up hydrogen chloride rate of 14 mols per day, the hydrogen chloride concentration in the recycle stream to the reactor (conduit 13) is only 79 volume percent, whereas, even with the lower make-up hydrogen chloride rate of only 2.5 mols per day when operating according to the invention, the concentration of hydrogen chloride in the recycle stream to the reactor (conduit 13) is 85 volume percent.

Said data also show that, from a practical standpoint, it would be impossible to obtain the results obtained from the combination operation if one attempted to do so by either the venting through vent gas absorber 29 alone or by operation of adsorbers 53 and 71 alone. For example, in the operation without the present invention, if one attempted to increase the hydrogen chloride concentration in the recycle stream to the reactor (conduit 13) by increased venting through conduit 36, the amount of gas vented would be much greater than 8500 s.c.f.d. and the hydrogen chloride make-up rate would be much greater than 14 mols per day. Similarly, if one discontinues venting through conduit 36 and removes non-condensibles only through conduit 61 after the treatment in adsorbers 53 or 71, said adsorbers 53 and 71 would have to be of such large size as to be impractical because the volume of tower 41 overhead which it would be necessary to treat would be much greater.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In a process for the conversion of a hydrocarbon in the presence of a metal halide catalyst and a hydrogen halide promoter in a reaction zone, wherein hydrocarbon effluent from said reaction zone is introduced into a stripping zone from which a gaseous stream rich in hydrogen halide is separated, non-condensible gases including hydrogen halide, gases lower boiling than hydrogen halide and other non-condensible gases boiling about the same as and higher than hydrogen halide are vented from the process system upstream from said stripping zone, and wherein said gaseous stream rich in hydrogen halide is recycled from said stripping zone to said reaction zone, the improvement comprising: venting non-condensible gases which are lower boiling than hydrogen halide, and a reduced amount of hydrogen halide from the process system upstream from said stripping zone; contacting a portion of said gaseous recycle in an adsorption zone with a solid adsorbent to selectively adsorb hydrogen halide therefrom; venting said other non-condensible gases which boil about the same as and higher than hydrogen halide from said adsorption zone as non-adsorbed gases; and subsequently desorbing said adsorbed hydrogen halide and returning same to said process system.

2. In a process for the isomerization of a hydrocarbon employing an aluminum chloride catalyst and a hydrogen chloride promoter therefor in a reaction zone, wherein hydrocarbon effluent from said reaction zone is introduced into a stripping zone from which a gaseous stream rich in hydrogen chloride is separated, non-condensible gases including hydrogen chloride, gases lower boiling than hydrogen chloride and other non-condensible gases boiling about the same as and higher than hydrogen chloride are vented from the process system upstream from said stripping zone, and wherein said gaseous stream is recycled to said reaction zone, fresh hydrogen halide is introduced to said process as make-up, and wherein the loss of hydrogen chloride vented with said non-condensibles is great enough to require excessive amounts of said make-up hydrogen halide, the improvement which comprises: venting non-condensible gases which are lower boiling than hydrogen chloride and a reduced amount of hydrogen chloride from the process system upstream of said stripping zone; passing a portion of said gaseous recycle stream to an adsorption zone and therein contacting same with a solid adsorbent to selectively adsorb hydrogen chloride therefrom; venting said other non-condensible gases which boil about the same as and higher than hydrogen chloride from said adsorption zone and said process system as non-adsorbed gases; and subsequently desorbing hydrogen chloride from said solid adsorbent and returning said desorbed hydrogen chloride to said process system.

3. The process of claim 2 wherein the hydrocarbon reactant feed comprises normal hexane and methylcyclopentane, said aluminum chloride catalyst is aluminum chloride hydrocarbon complex, and said solid adsorbent is activated alumina.

4. In a process for the conversion of a hydrocarbon employing a metal halide catalyst and a hydrogen halide promoter, wherein a reaction zone effluent is passed to a surge zone from which non-condensible gases comprising hydrogen halide, gases lower boiling than hydrogen halide and other non-condensible gases boiling about the same as and higher than hydrogen halide are vented from the process system, material from said surge zone is introduced into a hydrogen halide stripping zone wherein a gaseous stream rich in hydrogen halide is separated, said gaseous stream is recycled to said reaction zone, fresh hydrogen halide is introduced to said process system as make-up, and wherein the loss of hydrogen halide vented with said non-condensibles is great enough to require excessive amounts of said make-up hydrogen halide, the improvement which comprises: venting non-condensible gases which are lower boiling than hydrogen halide and a reduced amount of hydrogen halide from said surge zone; passing a portion of said gaseous recycle stream to a first adsoprtion zone and therein contacting same with a solid adsorbent to adsorb hydrogen halide therefrom; passing a portion of said hydrocarbon as a cooling medium in indirect heat exchange through said bed of adsorbent during said adsorption to remove the heat of adsorption; venting non-adsorbed gases from said adsorption zone and said process system during said adsorption; when said solid adsorbent in said first adsorption zone is spent, switching said portion of said gaseous recycle stream from said first adsorption zone to a second adsorption zone and therein contacting same with a solid adsorbent to selectively adsorb hydrogen halide therefrom; switching said stream of cooling medium from indirect heat exchange with said adsorbent in said first adsorption zone into indirect heat exchange with said adsorbent in said second adsorption zone to remove the heat of adsorption therefrom; venting non-adsorbed gases from said second adsorption zone and said process system during said adsorption; after said portion of said gaseous recycle stream and said cooling medium have been switched from said first adsorption zone to said second adsorption zone, passing a portion of hot bottoms product from said stripping zone as a heating medium in indirect heat exchange with said bed of adsorbent in said first adsorption zone to heat same to a temperature above the condensing temperature of a subsequently employed stripping gas; passing a portion of hot kettle vapors from the lower portion of said hydrogen halide stripping zone as a heated stripping gas through said bed of hot adsorbent in said first adsorption zone to desorb hydrogen halide therefrom; returning said desorbed hydrogen halide and said stripping gas to said surge zone; upon completion of said stripping operation, discontinuing passage of said stripping gas through said bed of adsorbent in said first adsorption zone and passing a stream of said cooling medium in indirect heat exchange with said adsorbent to cool same to an adsorbing temperature; when said solid adsorbent in said second adsorption zone is spent, switching said portion of said gaseous recycle stream from said second adsorption zone back to said first adsorption zone; and then regenerating said second adsorption zone as described for said first adsorption zone.

5. A process for the isomerization of a hydrocarbon, which process comprises: passing said hydrocarbon as feed together with a metal halide catalyst and a hydrogen halide promoter into a reaction zone and therein subjecting said hydrocarbon to the action of said catalyst and said promoter under isomerizing conditions; passing reaction zone effluent to a settling zone and therein settling catalyst from the hydrocarbon phase in said reaction zone effluent; returning said separated catalyst to said reaction zone; passing said hydrocarbon phase to a surge zone; venting non-condensible gases lower boiling than and lean in hydrogen halide from said surge zone; passing said hydrocarbon phase from said surge zone to a hydrogen halide stripping zone wherein a gaseous stream rich in hydrogen halide and containing other non-condensible gases boiling about the same as and higher than said hydrogen halide is separated; recycling the major portion of said gaseous stream rich in hydrogen halide to said reaction zone; passing a small portion of said gaseous stream rich in hydrogen halide to a first adsorption zone and therein contacting same with a solid adsorbent to selectively adsorb hydrogen halide therefrom; passing a small stream of said hydrocarbon feed as cooling medium in indirect heat exchange with said solid adsorbent during said adsorption so as to remove the heat of adsorption; venting non-adsorbed gases from said adsorption zone and said process system during said adsorption; when said solid adsorbent in said first adsorption zone is spent, switching said portion of said gaseous stream rich in hydrogen halide from said first adsorption zone to a second adsorption zone and therein contacting same with a solid adsorbent to selectively adsorb hydrogen halide therefrom; switching said stream of cooling medium from indirect heat exchange with said adsorbent in said first adsorption zone into indirect exchange with said adsorbent in said second adsorption zone to remove the heat of adsorption therefrom; venting non-adsorbed gases from said second adsorption zone and said process system during said adsorption; after said portion of said gaseous recycle stream and said cooling medium have been switched from said first adsorption zone to said second adsorption zone; passing hot bottoms product from said hydrogen halide stripping zone as heating medium in indirect heat exchange with said bed of adsorbent in said first adsorption zone to heat same to a temperature above the condensing temperature of a stripping gas subsequently employed; passing hot kettle vapors from the lower portion of said hydrogen halide stripping zone as stripping vapors through said bed of heated solid adsorbent in said first adsorption zone for a period of time sufficient to substantially strip the adsorbed hydrogen halide from said solid adsorbent; returning said desorbed hydrogen halide and said stripping vapors to said surge zone; upon completion of said stripping operation, discontinuing passage of said stripping vapors and passing a stream of said hydrocarbon feed through said bed of adsorbent in said first adsorption zone for a period of time sufficient to cool same to an adsorbing temperature; when said solid adsorbent in said second adsorption zone is spent, switching said portion of said gaseous stream rich in hydrogen halide from said second adsorption zone to said first adsorption zone; and then regenerating the solid adsorbent in said second adsorption zone in the manner described for said first adsorption zone.

6. The process of claim 5 wherein said hydrocarbon feed comprises normal haxane and methylcyclopentane, said catalyst is aluminum chloride hydrocarbon complex, said hydrogen halide is hydrogen chloride, and said solid adsorbent in said first and second adsorption zone is activated alumina.

7. An apparatus, comprising, in combination: a reactor adapted for the isomerization of hydrocarbons employing a metal halide catalyst and a hydrogen halide promoter; conduit means for introducing hydrocarbon feed into said reactor; conduit means for introducing metal halide catalyst, and hydrogen halide promoter into said reactor; a settling vessel, conduit means for transferring effluent from said reactor to said settling vessel; conduit means for recycling settled catalyst phase from said settling vessel to said reactor; a surge vessel; conduit means for transferring hydrocarbon phase from said settling vessel to said surge vessel; conduit means for introducing fresh hydrogen halide to said surge vessel; an absorption tower mounted on the top of and in open communication with said surge vessel; conduit means for introducing a liquid absorbent medium into the upper portion of said absorption tower; conduit means for venting gases from said surge vessel through said absorption tower; a hydrogen halide stripping tower; conduit means for transferring liquid hydrocarbon from said surge vessel to said stripping tower; cooling means for maintaining reflux conditions in the upper portion of said stripping tower; heating means provided for supplying heat to the bottom portion of said stripping tower; conduit means for removing a vapor product rich in hydrogen halide from the upper portion of said stripping tower; conduit means for recycling the major portion of said vapor product to said reactor; an adsorption tower; a bed of solid adsorbent in said adsorption tower; indirect heat exchange means disposed within said bed of solid adsorbent in said adsorption tower; conduit means for passing a minor portion of said vapor product rich in hydrogen halide from said stripping tower through said adsorbent in said adsorption tower; conduit means for removing non-adsorbed gases from said adsorption tower; conduit means for passing a portion of hot bottoms product from said stripping tower through said indirect heat exchange means in said adsorption tower; conduit means for passing hot stripping vapors from a lower portion of said stripping tower through said bed of adsorbent in said adsorption zone; heating means disposed in said last-mentioned conduit means; conduit means for passing stripped hydrogen halide from said adsorption tower to said surge vessel; and conduit means for passing cool hydrocarbon feed through said indirect heat exchange means in said adsorption tower as cooling medium.

8. An apparatus according to claim 7 wherein said conduit means for introducing a liquid absorbent medium into the upper portion of said absorption tower is connected to said conduit means for introducing hydrocarbon feed to said reactor so that a portion of said hydrocarbon feed is utilized as said absorbent medium.

References Cited by the Examiner
UNITED STATES PATENTS

| | | | |
|---|---|---|---|
| 2,408,950 | 10/1946 | Pines | 260—683.74 |
| 2,983,774 | 5/1961 | Thompson | 260—683.74 |

DELBERT E. GANTZ, *Primary Examiner.*

V. O'KEEFE, *Assistant Examiner.*

UNITED STATES PATENT OFFICE
CERTIFICATE OF CORRECTION

Patent No. 3,271,467                      September 6, 1966

Eddie U. Nakayama

It is hereby certified that error appears in the above numbered patent requiring correction and that the said Letters Patent should read as corrected below.

Column 11, line 17, for "adsoprtion" read -- adsorption --; column 12, line 19, after "indirect" insert -- heat --.

Signed and sealed this 5th day of September 1967.

(SEAL)
Attest:

ERNEST W. SWIDER                      EDWARD J. BRENNER
Attesting Officer                        Commissioner of Patents